Figure 3:
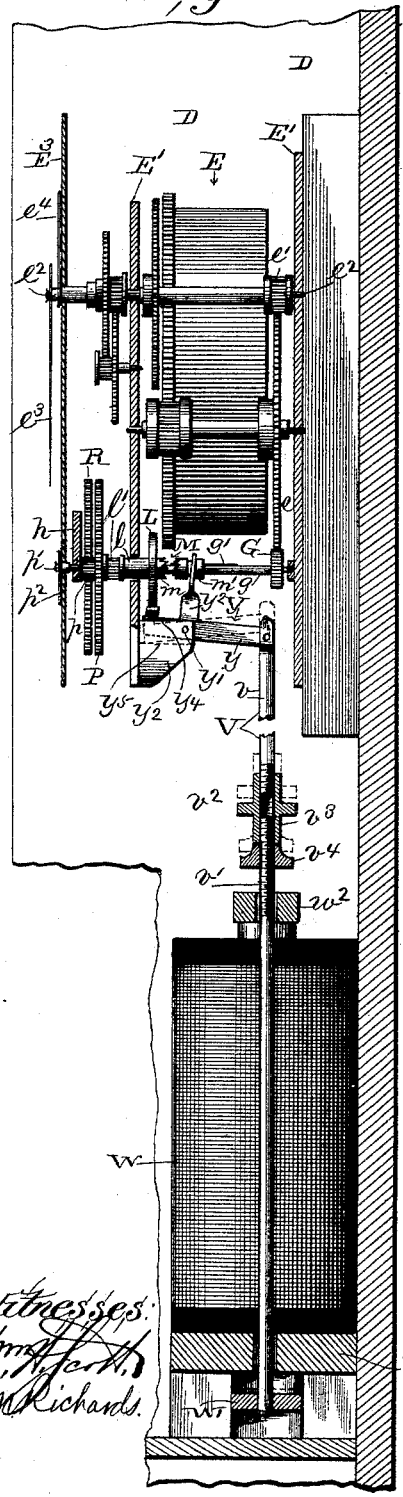

(No Model.)  3 Sheets—Sheet 1.
H. H. PATTEE.
ELECTRIC CURRENT TIME METER.
No. 498,022.  Patented May 23, 1893.
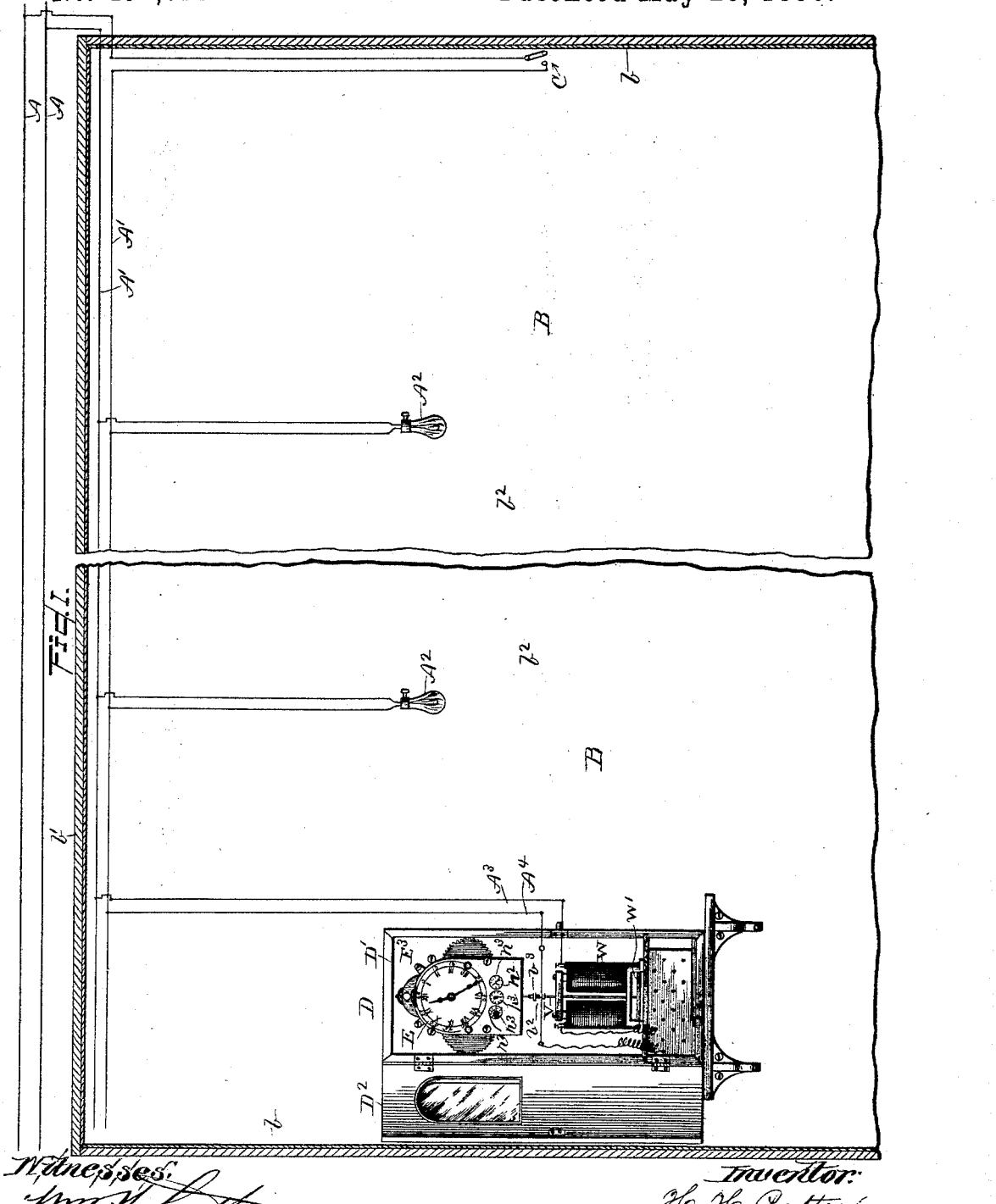

(No Model.) 3 Sheets—Sheet 2.
H. H. PATTEE.
ELECTRIC CURRENT TIME METER.
No. 498,022. Patented May 23, 1893.
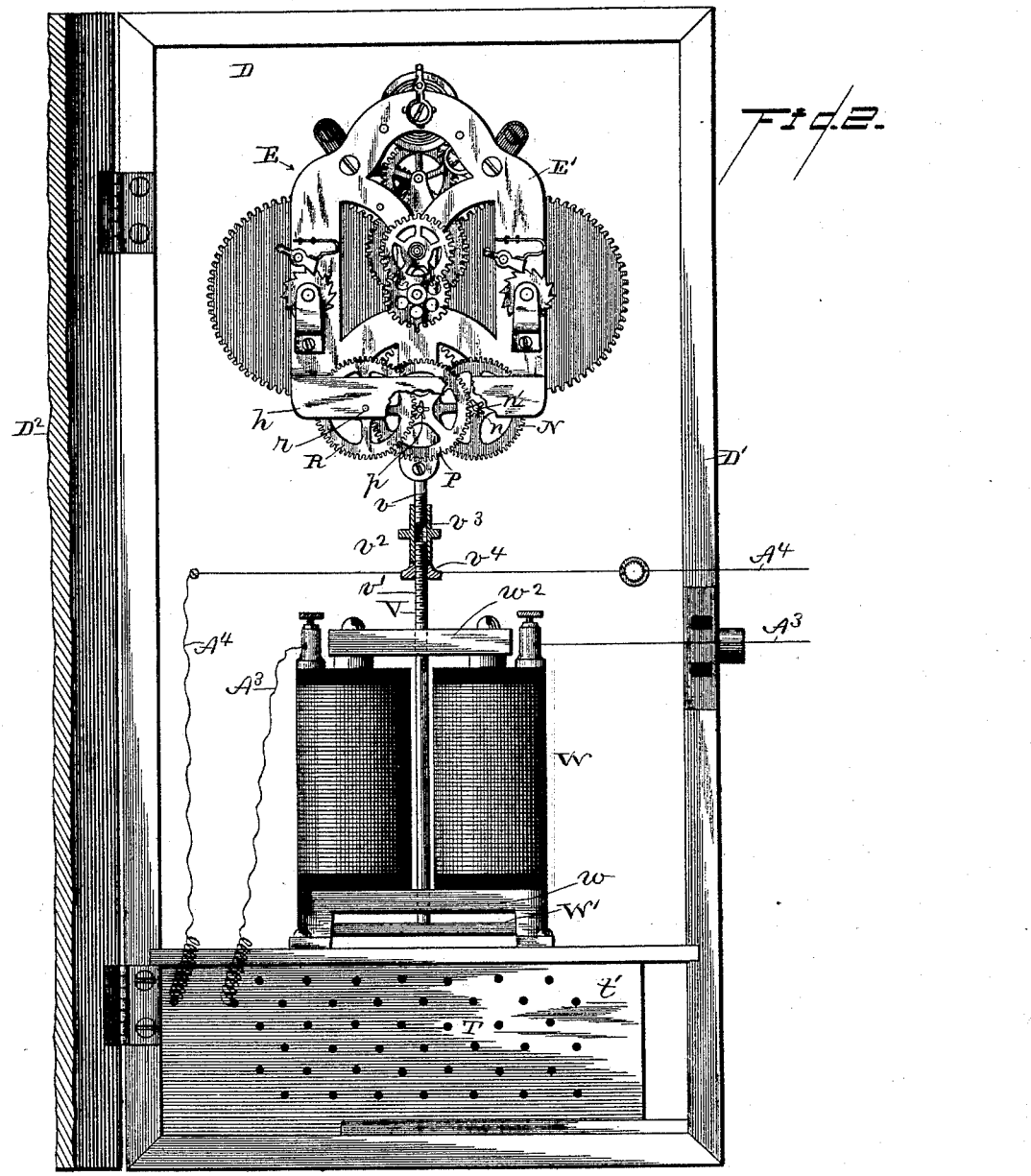
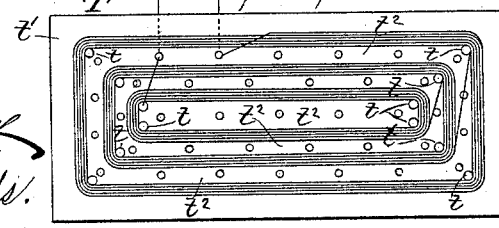

(No Model.) 3 Sheets—Sheet 3.

H. H. PATTEE.
ELECTRIC CURRENT TIME METER.

No. 498,022. Patented May 23, 1893.

Witnesses:

Inventor:
H. H. Pattee,
By W. B. Richards,
Atty.

UNITED STATES PATENT OFFICE.

HENRY H. PATTEE, OF MONMOUTH, ILLINOIS.

ELECTRIC-CURRENT TIME-METER.

SPECIFICATION forming part of Letters Patent No. 498,022, dated May 23, 1893.

Application filed September 6, 1890. Serial No. 364,200. (No model.)

*To all whom it may concern:*

Be it known that I, HENRY H. PATTEE, a citizen of the United States, residing at Monmouth, in the county of Warren and State of Illinois, have invented certain new and useful Improvements in Electric-Current Time-Meters, of which the following is a specification.

This invention relates to electric meters, of that class which automatically measure and register or record the duration of the passage of electric currents through wires or conductors, or in other words, which measure and record or register the time during which an electric current or a successional series thereof are passing through a wire or conductor; and the invention relates more especially to that type of such electric meters in which a divided portion of the electric current, such as is used to operate an electric motor or motors, an electric lamp or lamps, or for other purposes, is also made, when the electric current is established, to throw a time registering mechanism into gear with a continuously running clock movement, whereby the time registering mechanism will be operated by and with the clock movement while the electric current is established, and will be thrown out of gear with the clock movement and its operations cease when the electric current is broken.

While my invention may be used to measure and record the time during which an electric current or successional series of electric currents are passing over or through an electric current conductor when such conductor and the electric current which it carries are adapted and applied to supply propulsive energy to operate an electric motor or motors, an electric lamp or lamps, or for other uses and purposes, I have shown it and described it herein as adapted and used for the purpose of furnishing means for measuring and recording the time during which a single lamp or separate groups of incandescent electric lamps have, each lamp or group of lamps, been lighted or energized by the divisional portion of a main electric current, which operates said lamp or group of lamps, whereby readings may be made at given periods, say of one month, week, or other desired period, showing the sum of the times that such electric lamp or lamps have been used during said period, in any particular building, room or other place lighted by a lamp or lamps connected with one branch of an electric circuit.

The novel means employed in carrying out the foregoing recited objects and purposes of my invention, as adapted for measuring and recording the duration of electric currents over branches of electric conductors, are hereinafter described, and the combinations and constructions thereof in which the invention consists are made the subject matter of the claims hereto appended.

The preferred construction of parts and arrangements thereof are illustrated in the accompanying drawings, in which—

Figure 4:
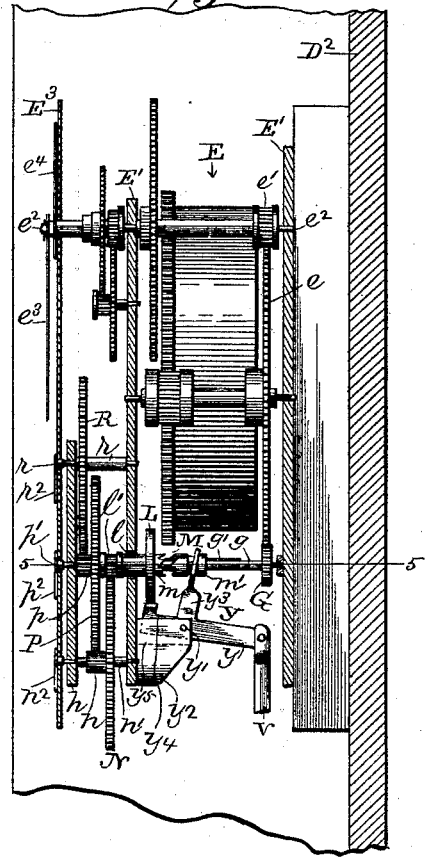
Figure 5:
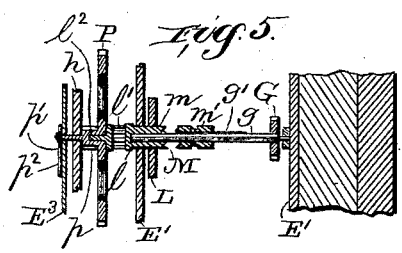

Figure 1 is an elevation of part of the main circuit wires or conductors, in an ordinary system of electric lighting apparatus, of branch wires leading therefrom and provided with electric lamps, and of my electric meter, and a sectional elevation of a room or building in which the lamps are located, and to one wall of which the meter is fixed; Fig. 2, an enlarged elevation, partly broken away, of my electric meter, shown with the door of its containing case partly broken away and open, and also shown with the clock movement face plate and the time registering dials and pointers removed; Fig. 3, an enlarged central sectional elevation of the electro-magnet, clock movement, time registering mechanism, and part of the containing case. Fig. 4 is an elevation, partly in section, showing parts of the clock movement and time registering mechanism in gear, as in Figs. 1, 2, and 3, but some of the parts in changed positions from that shown at said figures, in order to show more clearly in one figure the co-operation of certain parts, which could not be otherwise shown. This figure shows the system of gear wheels and other parts of the time registering mechanism arranged in a vertical plane, instead of a horizontal plane, as shown in Figs. 1, 2 and 3. Fig. 5, is a sectional plan, in the line 5, 5, in Fig. 4; Fig. 6, a sectional elevation lengthwise of the resistance coil.

The reference letters used indicate respectively, the same parts in the different figures of the drawings.

The parts of cable or main conductor wires, A, shown in the drawings, may be cables or main conductors of any ordinary kind, extending from any ordinary dynamo electric machine or machines, (not shown,) or from any suitable generator of electric currents.

At Fig. 1 I have shown wires A', connected with the main wires or conductors A in an ordinary way, and which extending therefrom constitute an ordinary branch or division of the main circuit. The branch wires A', as shown, extend into a room B, two of the walls $b$ and the ceiling $b'$ of which are shown in section, and one wall $b^2$ in elevation. The wires A' are provided with a switch C, which is opened and closed to open and close the circuit, in an ordinary manner.

In the drawings I have shown two incandescent electric lamps $A^2$ connected with the wires A' in an ordinary manner, but it will be understood that any number of lamps may be used that will be practical. The wires A' are shown as disconnected at their distal ends, to provide for extensions to other rooms or places, or for subdivisions into subordinate branches, as may be desired or required for lighting purposes or for other purposes.

The operative parts of the meter D are assembled and mounted in a suitable case D', which has an ordinary door $D^2$. The case D', as shown at Fig. 1, is fixed to the wall $b^2$ of the room B, but may be fixed in any suitable location where the wires A' can be connected with the meter as hereinafter described.

The clock movement E, shown in the drawings, is an ordinary spring movement, but any other suitable time movement or train may be used if preferred. The movement E is mounted in an ordinary frame E', which frame is preferably fixed in the upper part of the case D', but may be located in any other part thereof if preferred. The clock movement or train need not be further herein described than to point out that its main wheel $e$, see Figs. 3 and 4, gears with the pinion $e'$ on the shaft $e^2$ which carries the minute hand $e^3$ of the clock, and operates the hour hand $e^4$ and minute hand in an ordinary manner. The main wheel $e$ also gears with and rotates a pinion G which is fixed upon a shaft $g$, and this pinion G has same number of cogs as the pinion $e'$, and hence the pinion G and shaft $g$ complete a rotation once an hour simultaneously with the minute hand of the clock, and operate continuously with the clock movement. The pinion G and shaft $g$ constitute the intermediary gear between the clock movement and the electric current time registering mechanism hereinafter described, and which consists in a registering mechanism, and a clutch gear, which clutch gear is operated by establishing and breaking the electric circuit, for the purpose of throwing said registering mechanism into and out of gear with the shaft $g$, and thereby into and out of gear with the clock movement. The electric current registering mechanism is mounted in the clock frame E' and a frame bar $h$ which is supported in front thereof.

L is a smooth rim friction wheel, loosely seated on the end of the shaft $g$, and has fixed to its inner side one member $m$, of a clutch M, and fixed to its outer side a hub $l$, on the outer end of which is fixed a pinion $l'$, which gears with and rotates a wheel N, to which is fixed a pinion $n$. The wheel N is fixed upon a shaft $n'$, and this shaft $n'$ extends outwardly and carries a hand or pointer $n^2$ which traverses a dial $n^3$ that is circularly graduated and marked into ten equal divisions, on the clock face $E^3$, which face is preferably carried in a plane in front of the system of gear of the registering mechanism. The wheel N has ten times as many cogs as the pinion $l'$, and hence will give ten complete rotations to the pointer $n^2$ to each single rotation of the pinion $l'$, when said pinion $l'$ is placed in gear with, to rotate simultaneously with, the shaft $g$ by sliding the member $m'$ of the clutch M into gear with the member $m$—the member $m'$ being free to slide lengthwise of the shaft $g$, but held to rotate therewith by the spline $g'$. The ten divisions of the dial $n^3$ will thus indicate each an hour, and all of them ten hours, as the pointer $n^2$ traverses them.

The pinion $n$ gears with a wheel P, which is journaled on a short journal $l^2$ that projects axially from the end of the pinion $l'$ (see Fig. 5), and a pinion $p$ is fixed to the outer side of the wheel P, from which a short shaft $p'$ extends outwardly, and carries on its outer end a pointer $p^2$ which traverses a dial $p^3$ that is circularly graduated into ten equal divisions. The wheel P having ten times as many cogs or teeth as the pinion $n$, will be rotated once to each ten rotations of the wheel N, and hence the pointer $p^2$ at each division of the dial $p^3$—will indicate a complete rotation of the pointer $n^2$, and a complete rotation of the pointer $p^2$ indicate ten rotations of the pointer $n^2$. The pinion $p$ gears with a wheel R, the shaft $r$ of which extends outwardly and carries on its outer end a pointer $r^2$ which traverses a dial $r^3$ that is circularly graduated into ten equal divisions. The wheel R having ten times as many cogs as the pinion $p$ will be rotated once by ten rotations of the wheel P, and hence the pointer $r^2$ at each division of the dial $r^3$ will indicate a complete rotation of the pointer $p^2$, and a complete rotation of the pointer $r^2$ will indicate ten rotations of the pointer $p^2$, and one hundred rotations of the pointer $n^2$.

An ordinary electro magnet W and a resistance coil T are fixed in the case D', and a conductor or wire $A^3$ extends from one of the wires A' to the wire coils of the magnet W, and thence to the wire coils of the resistance coil T, from which a wire $A^4$ extends to the other wire A', and thus completes a circuit of the wires $A^3$, $A^4$, through the electro magnet and resistance coil.

One main object of the electro magnet and the entire object of the auxiliary resistance coil when used therewith as in my improvement, is to increase the resistance to such an extent as to reduce the ampères of the electric current that may pass through the wires $A^3$, $A^4$, $A'$, to the minimum flow necessary to operate the trip mechanism which is operated by starting and stopping the electric current, to throw the registering mechanism into and out of gear with the clock movement or train.

The size of the wire, its material, and its convolutions on the cores of the electro magnet can be such as to produce sufficient ohms of resistance to the passage of the electric current without an auxiliary resistance medium or coil, but I have found by experience that an electro magnet so constructed as to offer such great resistance, when applied to such uses and purposes as herein contemplated, will heat to an objectionable degree; hence I prefer using an auxiliary resistance medium in combination with the electro magnet.

A preferred auxiliary resistance medium is shown at Figs. 1, 2 and 6, consisting of a resistance coil T, in which the wires are wound or coiled upon pins $t$, which pins are fixed in frame plates $t'$, and located as shown at Fig. 6, or in any ordinary manner which will permit the passage of air through open spaces $t^2$ between the series of coils of the wire, for the purpose of preventing it heating to any objectionable extent. This auxiliary resistance coil T, as shown, is located below the electro magnet, but it may be located in any other suitable or desirable place. By using the resistance coil, as shown and described, and of such wire as is best adapted for the purpose, only the passage of the very small amount of electric current will be permitted, which is sufficient to operate the trip mechanism of the meter, and an electro magnet may be used not having such resistance as will cause it to become heated.

It will be evident to any person skilled in the art to which this invention appertains, that various kinds of resistance coils or resistance mediums of any suitable kind may be used as auxiliary to the electro magnet, which mediums or coils have sufficient and proper ohms of resistance to the passage of the electric current.

A rod V is fixed to and extends upwardly from the armature $W'$ of the electro magnet W, and passes through suitable bearings in the frame bar $w$ on which the magnet rests, and through the back armature or yoke $w^2$, in which bearings it slides lengthwise of itself with the movements of the armature $W'$ to and from the electro magnet, while said bearings serve to not only stay and direct the rod V, but also serve to hold the armature in proper alignment with the cores or poles of said magnet. The upper end of the rod V is pivotally connected with one arm $y$ of a three-armed lever Y, which lever Y is pivoted at $y'$ to a bracket plate $y^2$ which projects from a bar of the clock movement frame. Another arm $y^3$ projects from the lever Y and strides a circumferentially grooved part of the member $m'$ of the clutch M, and its third arm $y^4$ is adapted to come in contact with and to be released from the friction wheel L, as hereinafter described.

To provide means for adjusting the rod V to proper lengths to suit different adjustments of the clock movement and registering mechanism relatively to the electro magnet, and for the removal and replacement of the clock and register, or the electro magnet, without removal of the other, I have shown the rod V as formed in two parts, $v$ and $v'$, united by a coupling $v^2$, (see Figs. 2 and 3,) in which a threaded sleeve $v^3$ is used to unite the adjacent threaded ends of the parts $v$, $v'$, and is held in place after adjustment by a jam nut $v^4$, which screws upon the part $v'$.

To adjust the parts $v$, $v'$ to make the rod V the proper length, the part $v$ should be raised until the end of the lever Y strikes the shoulder $y^5$ in the bracket $y^2$, as shown by dotted lines at Figs. 3 and 4, and the part $v'$ be raised until the armature comes in contact with the magnets, when the sleeve $v^3$ may then be screwed into place on the adjacent ends of said parts to fix and hold them in place.

When the switch C is open, as shown at Fig. 1, there will not be any electric current through the electro magnet, and the armature will remain free from said magnet and in its lower position, as shown by full lines in the drawings, and in this position will through the instrumentality of the rod V hold the lever Y in the position shown by full lines in the drawings, in which position the arm $y^3$ will hold the member $m'$ of the clutch out of engagement with the member $m$, and thereby permit the clock movement to run without operating the registering mechanism.

When the switch C is closed to establish an electric current through the wires $A'$ to operate the lamps or other devices that may be operated by the electric current, a portion of said current as permitted by the resistance of the electro magnet and the resistance medium as hereinbefore described, will pass through the electro magnet and resistance coil, and the armature will be attracted or drawn upwardly to the poles of the magnet, thereby raising the rod V upwardly to tilt or swing the lever Y into the position shown by dotted lines at Fig. 3, and move the member $m'$ of the clutch into engagement with the member $m$, and thereby throw the clock movement into gear with the registering mechanism. The registering mechanism will then be operated by the clock movement so long as the electric current is continued unbroken and the clock movement running. When the lever Y is swung into the position shown by full lines at Figs. 3 and 4, to throw the clock movement out of gear with the registering mechanism, as hereinbefore described, the end $y^4$ of said lever will be brought into contact with the periphery of the wheel L, to act as a brake to prevent movement of the parts of the registering mechanism until again thrown into gear with the clock movement by again closing the key C and starting the electric current through the magnet. Without this brake the friction of the shaft $g$ in the hub of the wheel L might cause it to operate the registering mechanism when the clutch M was not in gear. I prefer a friction wheel L to a gear wheel in which the brake might act as a detent click, as a friction brake and wheel will not arrest the movement of the wheel L and other parts so suddenly as to cause any jar to the parts.

When the armature is in its elevated position, and the members $m$, $m'$, of the clutch in gear, the end $y^4$ of the lever Y, as shown by dotted lines at Fig. 3, will be in contact with the shoulder $y^5$, of the bracket $y^2$ also shown by dotted lines at same figure, and will hold the member $m'$ from being pressed by the armature against the member $m$ with such force as may produce friction in any of the journal bearings of the registering mechanism.

Readings are taken from the dials $n^3$, $p^3$, and $r^3$ in an ordinary manner, that does not require description herein, and any reading or record shown or indicated by the respective pointers on said dials while it shows the number of hours that the registering pointers $n^2$, $p^2$, and $r^2$ have been operated by the clock movement, also shows the number of hours that the electric current has been used in lighting the lamps or for other purposes.

I prefer a clock movement that will run one month, so that readings can be taken from the register once a month, and the clock wound at the same time, but a clock movement that will not run so long a time may be used, and wound when required.

It will be evident that the hands of the clock movement will point out the time of day in an ordinary manner.

I do not consider the scope of my invention as limited by any means to its use alone on a branch or branches of a main electric circuit, as it will be evident to any person skilled in such matters that the invention may be adapted to a main circuit by simply fitting and constructing the parts for such use, in an apparent manner.

Having thus described my invention, what I claim as new, and desire to secure by Letters Patent, is—

1. In a meter for measuring and registering the duration of electric currents, the combination with an electro magnet, its armature, a clock movement and a time registering mechanism, of a trip mechanism operated by the movements of the armature, and consisting of a rod which is connected at one end with the armature, the other end being connected with one arm of an elbow-lever, another arm of said elbow-lever being adapted to engage with or operate a clutch to throw the clock movement into gear with the time register, substantially as and for the purpose specified.

2. In a meter for measuring and registering the duration of electric currents, the combination with an electro magnet, its armature, a clock movement and a time registering mechanism, of a trip mechanism, operated by the movements of the armature, and consisting of a rod adjustable in length, which is connected at one end with the armature, the other end being connected with one arm of an elbow-lever, another arm of said elbow-lever being adapted to engage with or operate a clutch to throw the clock movement into gear with the time register, substantially as and for the purpose specified.

3. In a meter for measuring and registering the duration of electric currents, the combination with an electro magnet, its armature, a clock movement, and a time registering mechanism, of the rod V, one end of which rod is connected with said armature and the other end with one arm of an elbow-lever Y, a clutch M adapted to be operated by another arm of said elbow-lever to connect the clock movement to the registering mechanism, a shaft $g$ and pinions G and $l'$ connected with said shaft and friction wheel L fixed to rotate with the pinion $l'$, and adapted to be operated upon by another arm of the lever Y, substantially as and for the purpose specified.

4. In a meter for measuring and registering the duration of electric currents, the combination with an electro magnet, its armature, a clock movement, and a time registering mechanism, of the rod V one end of which rod is connected with said armature and the other end with one arm of an elbow-lever Y, pivoted in a bracket so that one of its ends or arms $y^4$ will strike a shoulder $y^5$ of said bracket when the armature and rod V connected therewith are moved upwardly, a clutch M adapted to be operated by another arm of said elbow-lever to connect the clock movement to the registering mechanism, a shaft $g$ and pinions G and $l'$ connected with said shaft at opposite ends thereof, substantially as and for the purpose specified.

5. In a meter for measuring and registering the duration of electric currents the combination with a clock movement and a registering mechanism, of the elbow-lever Y adapted to operate a divided or two-part clutch M to connect the clock movement and registering mechanism together, one of the parts or members of said clutch being connected with the registering mechanism and the other part with the clock movement, a shaft $g$ and pinion G thereon, connected with the clock movement and a pinion $l'$ fixed to one part or member of said clutch M, all arranged and adapted to operate substantially as and for the purposes set forth.

6. In a meter for measuring and registering the duration of electric currents the combination with a clock movement and registering mechanism of an elbow-lever Y adapted to operate a divided or two-part clutch M to connect the clock movement and the registering mechanism together, a shaft $g$, a pinion G thereon connected with the clock movement a pinion $l'$ connected with the time registering mechanism and fixed to rotate with one member $m$ of the clutch M, a friction wheel L also fixed to the said member $m$ and adapted to be operated on by one arm of the elbow-lever Y substantially as and for the purposes set forth.

7. In a meter for measuring and registering the duration of electric currents the combination with a clock movement and registering mechanism of a wheel N adapted to engage with a pinion $l'$, a wheel P adapted to engage with a pinion $n$, a wheel R adapted to engage with a pinion $p$ and pointers $n^2$, $p^2$ and $r^2$ all forming part of the registering mechanism, a divided or two-part clutch M, one member of which is fixed to the pinion $l'$, a shaft $g$ and pinion G connected therewith forming part of the clock movement, and an elbow-lever Y adapted to operate the other member of said clutch to lock them together so as to connect the clock movement and registering mechanism together, substantially as and for the purposes specified.

In testimony whereof I affix my signature in presence of two witnesses.

HENRY H. PATTEE.

Witnesses:
R. C. HUNT,
CHARLES BROWN.